(12) United States Patent
Saka et al.

(10) Patent No.: US 8,363,263 B2
(45) Date of Patent: Jan. 29, 2013

(54) IMAGE PROCESSING APPARATUS AND IMAGE PROCESSING METHOD

(75) Inventors: Masaaki Saka, Toyohashi (JP); Tomohiro Yamaguchi, Shinshiro (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 787 days.

(21) Appl. No.: 12/390,709

(22) Filed: Feb. 23, 2009

(65) Prior Publication Data

US 2009/0213400 A1    Aug. 27, 2009

(30) Foreign Application Priority Data

Feb. 25, 2008  (JP) ................................. 2008-042984

(51) Int. Cl.
*G06F 15/00* (2006.01)
(52) U.S. Cl. ........... 358/1.2; 358/1.9; 382/299; 382/300
(58) Field of Classification Search .................... 358/1.9, 358/1.17, 520, 1.2; 382/300, 293, 274, 162, 382/103, 205, 203, 299, 298
See application file for complete search history.

(56) References Cited

U.S. PATENT DOCUMENTS

| | | | | | |
|---|---|---|---|---|---|
| 5,305,395 | A | * | 4/1994 | Mahoney et al. | 382/205 |
| 5,341,174 | A | * | 8/1994 | Xue et al. | 348/576 |
| 5,343,558 | A | * | 8/1994 | Akeley | 345/426 |
| 5,726,780 | A | * | 3/1998 | Hirota et al. | 358/520 |
| 6,624,825 | B1 | * | 9/2003 | Fujiyoshi | 345/698 |
| 6,768,559 | B1 | * | 7/2004 | Kuwata et al. | 358/1.9 |
| 7,177,463 | B2 | * | 2/2007 | Kusakabe et al. | 382/162 |
| 7,365,873 | B2 | * | 4/2008 | Ohta | 358/1.17 |
| 7,379,561 | B2 | * | 5/2008 | Chauville et al. | 382/103 |
| 7,414,639 | B2 | * | 8/2008 | Mutoh | 345/667 |
| 2004/0252316 | A1 | | 12/2004 | Miyagi et al. | |
| 2006/0274332 | A1 | * | 12/2006 | Miyagi | 358/1.2 |
| 2007/0110330 | A1 | * | 5/2007 | Chauville et al. | 382/274 |
| 2008/0310758 | A1 | * | 12/2008 | Kashibuchi | 382/293 |

FOREIGN PATENT DOCUMENTS

| | | |
|---|---|---|
| JP | 06-334856 | 12/1994 |
| JP | 11-213152 A | 8/1999 |
| JP | 2001-086324 | 3/2001 |
| JP | 2001-211316 | 8/2001 |
| JP | 2004-228811 A | 8/2004 |

OTHER PUBLICATIONS

Notification of Reason(s) for Refusal issued in the corresponding Japanese Patent Application No. 2008-042984 dated Jan. 19, 2010, and an English Translation thereof.

* cited by examiner

*Primary Examiner* — David K Moore
*Assistant Examiner* — Ashish K Thomas
(74) *Attorney, Agent, or Firm* — Buchanan Ingersoll & Rooney PC (57) ABSTRACT

An image processing apparatus includes a region determination unit detecting attributes of image data generated by a reading unit; an image modification unit generating attribute data based on the results of the determination performed by the region determination unit; an image conversion processing circuit performing resolution conversion processing on the image data of a pixel of interest; and an attribute conversion processing circuit performing resolution conversion processing on the attribute data of the pixel of interest. The attribute resolution converter employs attribute data identical to the attribute data before being subjected to the attribute resolution conversion processing as the attribute data for the pixel of interest following the attribute resolution conversion processing, and employs the attribute data after being subjected to the attribute resolution conversion processing as the attribute data for neighboring pixels to the right and left of the pixel of interest following the attribute resolution conversion processing.

24 Claims, 9 Drawing Sheets

ATTRIBUTE DECODING PROCESS

[3] : 0: NOT HALFTONE / 1: HALFTONE
[2] : 0: NOT EDGE / 1: EDGE
[1:0] : 0: NONE / 1: WHITE CHARACTER / 2: COLOR CHARACTER /
      3: BLACK CHARACTER

FIG. 5B

INTERPOLATION PROCESS (OBTAINING A LOGICAL SUM)

0 : NOT HALFTONE          0 : NOT HALFTONE
1 : EDGE                  0 : NOT EDGE
1000 : BLACK CHARACTER    0001 : NO CHARACTER

FIG. 5C

ATTRIBUTE RE-ENCODING PROCESS

IMAGE PROCESSING APPARATUS AND IMAGE PROCESSING METHOD

This application is based on Japanese patent application No. 2008-042984 filed on Feb. 25, 2008, the contents of which are hereby incorporated by reference.

BACKGROUND OF THE INVENTION

1. Field of the Invention

The present invention relates to an image processing apparatus and an image processing method used in an image forming apparatus such as an MFP.

2. Description of the Related Art

Image processing apparatuses, which process image data, are conventionally provided in image forming apparatuses called MFPs, or Multi-Function Peripherals.

Such image processing apparatuses execute resolution conversion processing on image data and attribute data, thereby scaling (enlarging or reducing) that data, in order to adjust the image data and attribute data to the print size, resolution of the printer, and so on.

The nearest neighbor method, the bilinear method, and the bicubic method are known as examples of methods for executing scale processing on image data. The nearest neighbor method, also known as the nearest neighbor algorithm, uses the image data (luminance data) of a pre-scaling pixel nearest in distance to the pixel that is to be interpolated (a pixel of interest).

The bilinear and bicubic methods are linear interpolation methods, which interpolate image data having taken the pixels surrounding a pixel of interest into consideration.

While the nearest neighbor method can be applied to both binary image data and multivalued image data, the bilinear and bicubic methods cannot interpolate binary image data (that is, the meaning of the data is altered, and thus the methods cannot be applied).

Figure 5A:
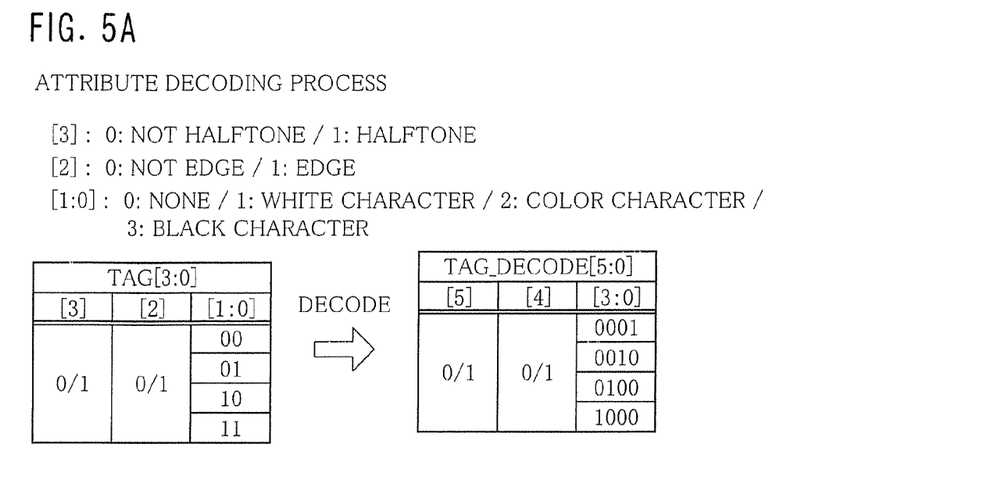
FIGS. 5A through 5C are diagrams illustrating a method for generating attribute data for pixels in an interpolated pixel generation region.
Figure 5B:
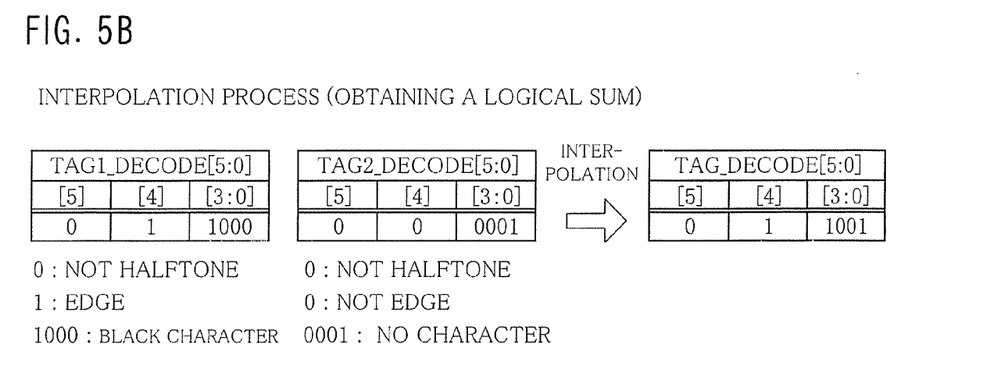
Figure 5C:
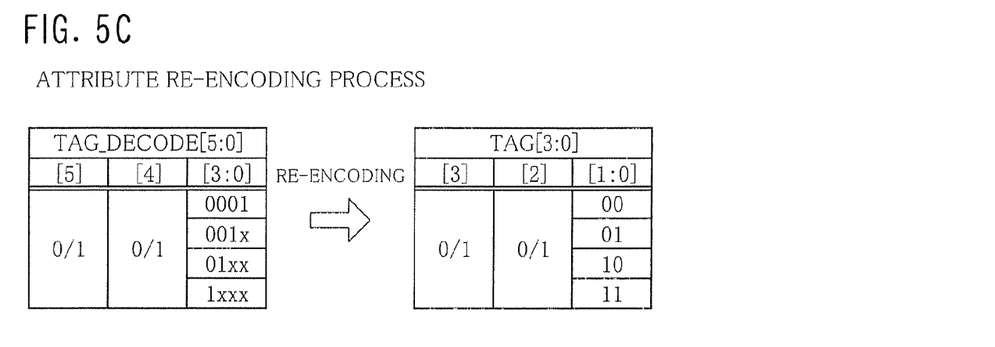

Generally speaking, image data is multivalued data, and therefore the bicubic method, which can attractively interpolate the image data, is often used for scaling. However, attribute data is typically binary data, as illustrated in FIG. 5 and described later, and therefore the nearest neighbor method is used for the scaling thereof.

Figure 7:
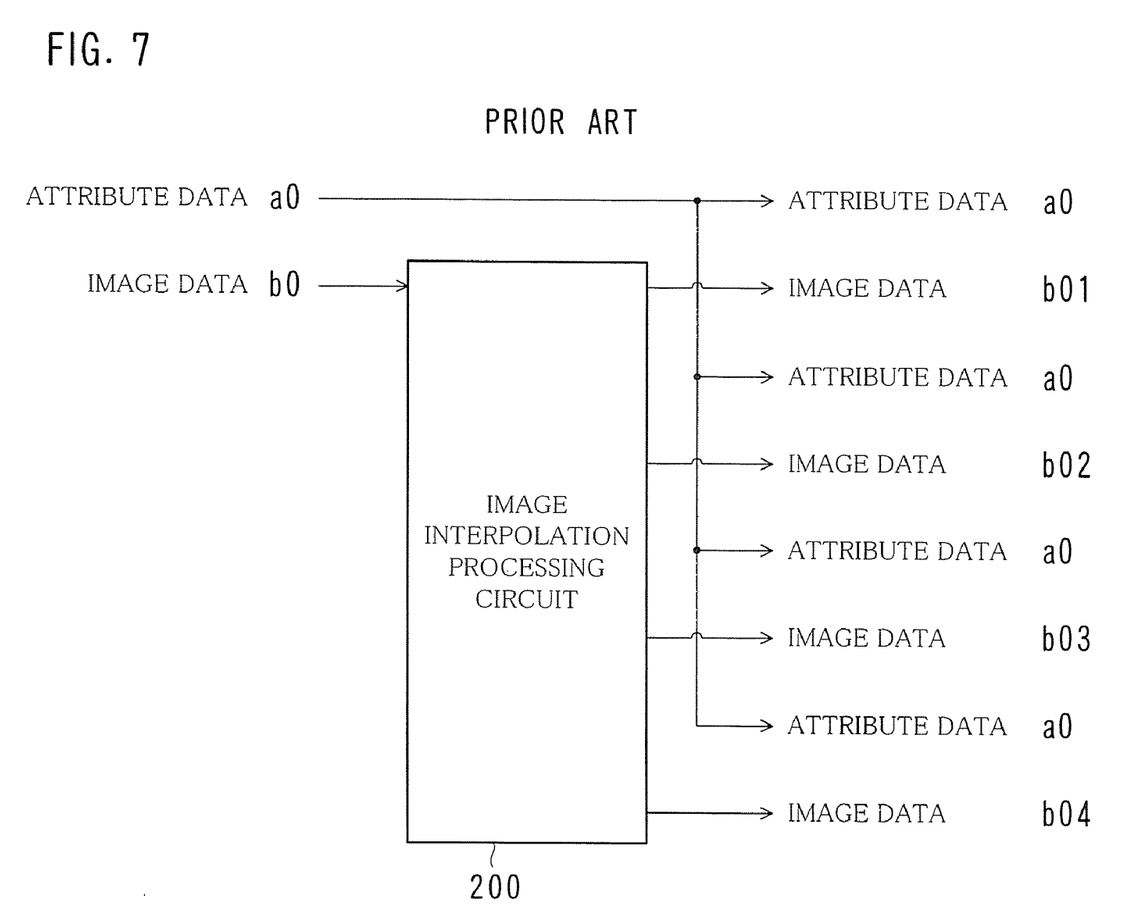
FIG. 7 is a block diagram illustrating a conventional configuration for performing resolution conversion on image data and attribute data.

FIG. 7 illustrates resolution conversion processing that performs 4× enlargement on attribute data a0 and image data b0 using the nearest neighbor method. In this example, an image interpolation processing circuit 200 converts the resolution of the image data b0, resulting in image data b01, b02, b03, and b04. Meanwhile, the attribute data a0 is simply duplicated into four instances of attribute data a0.

Figure 8:
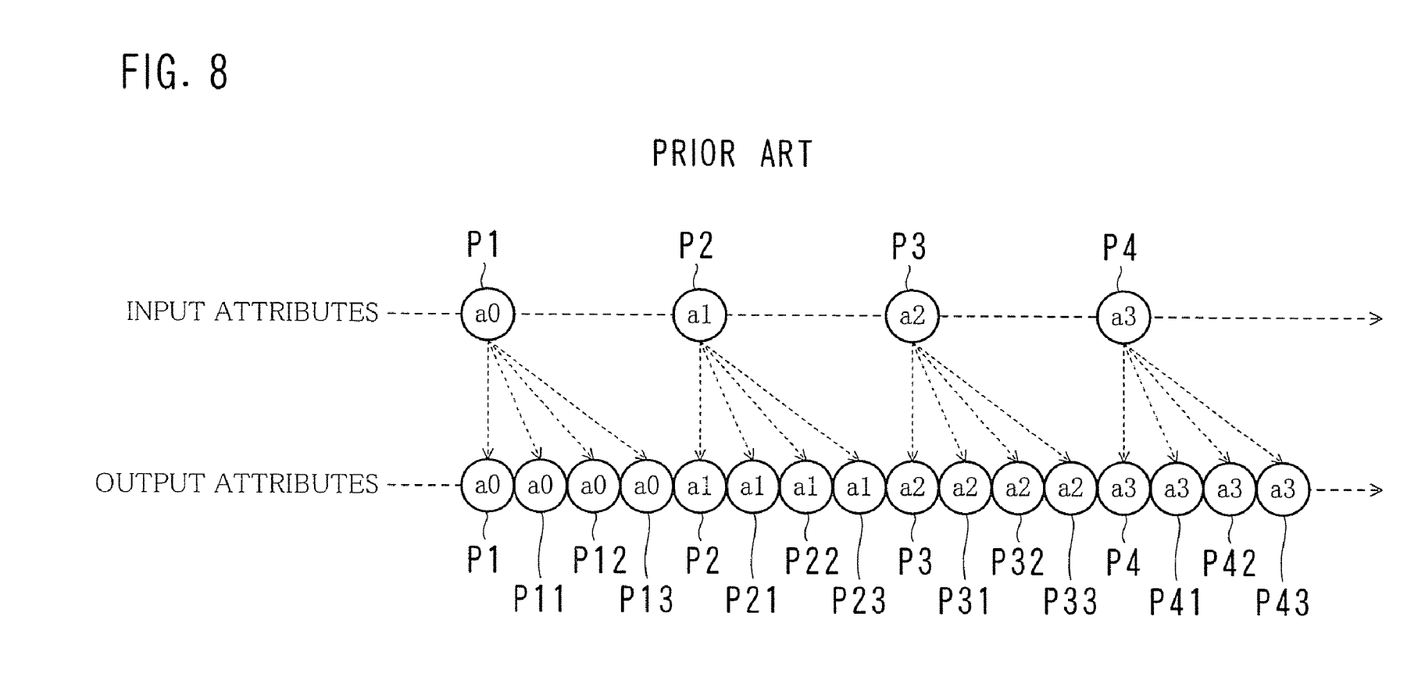
FIG. 8 is a diagram illustrating resolution conversion according to the nearest neighbor method.

FIG. 8 illustrates resolution conversion processing using the nearest neighbor method on a pixel-by-pixel basis, where the attribute data of pixels of interest P1, P2, P3, and P4 are taken as a0, a1, a2, and a3, respectively. As a result of this processing, the attribute data of the pixel P1, a pixel P11 adjacent to the pixel P1, a pixel P12 adjacent to the pixel P11, and a pixel P13 adjacent to the pixel P12 each take on attribute data a0; the attribute data of the pixel P2, a pixel P21 adjacent to the pixel P2, a pixel P22 adjacent to the pixel P21, and a pixel P23 adjacent to the pixel P22 each become attribute data a1; the attribute data of the pixel P3, a pixel P31 adjacent to the pixel P3, a pixel P32 adjacent to the pixel P31, and a pixel P33 adjacent to the pixel P32 each become attribute data a2; and the attribute data of the pixel P4, a pixel P41 adjacent to the pixel P4, a pixel P42 adjacent to the pixel P41, and a pixel P43 adjacent to the pixel P42 each take on attribute data a3. In this manner, attribute data ZD is simply duplicated when the resolution conversion processing is carried out.

Region determination processing, for determining which region each pixel of inputted image data belongs to, is typically carried out prior to the image data being outputted (see Patent Document 1, JP H11-213152A). According to the image processing apparatus disclosed in Patent Document 1, the absolute value of the difference in pixel values between a neighboring pixel and either an adjacent pixel, a neighboring pixel located at a predetermined distance from the pixel of interest within a predetermined range, or both is found. The attributes of the predetermined pixel are then identified based on that absolute value.

In addition, in order to obtain a high-quality image for reproduction, determining the image attributes of an image signal, generating an attribute determination signal that indicates the image attributes, and carrying out image processing using a signal in which the attribute determination signal is embedded into the image signal in a predetermined format are disclosed in Patent Document 2, JP 2004-228811A.

However, the following problems arise when resolution conversion processing is performed on attribute data using the nearest neighbor method.

Figure 9:
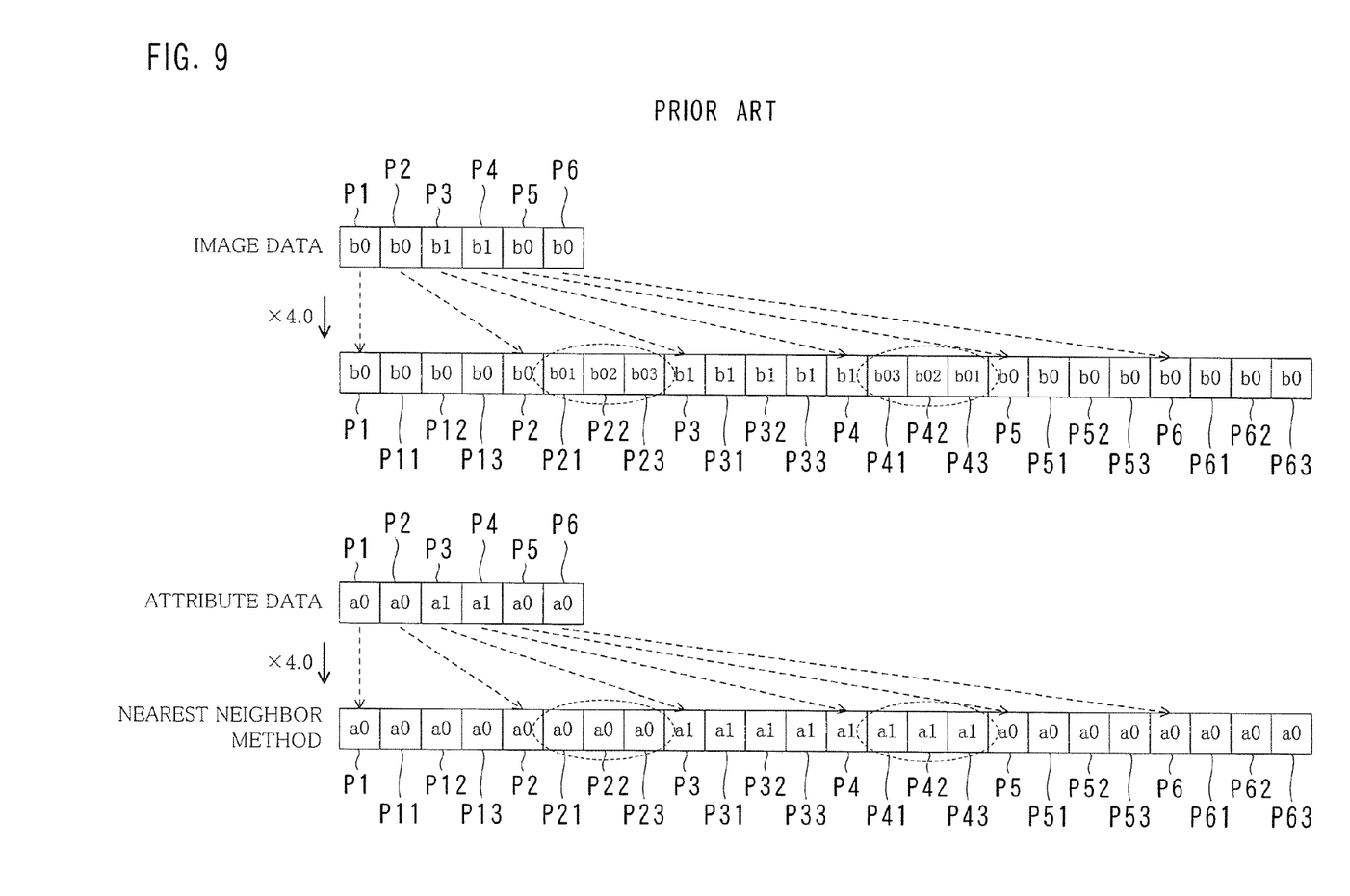
FIG. 9 is a diagram illustrating a problem with resolution conversion according to the nearest neighbor method.

Assuming that, as illustrated in FIG. 9, the image data (luminance data) of pixels P1 to P6, which are pixels of interest, is, in order, b0 (white data), b0, b1 (black data), b1, b0, and b0, the data becomes as follows when enlarged 4× through a predetermined resolution conversion processing (the bicubic method): the image data of pixels P1, P11, P12, and P13 becomes b0; the image data of pixels P2, P21, P22, and P23 becomes, in order, b0, b01, b02, and b03; the image data of pixels P3, P31, P32, and P33 becomes b1; the image data of pixels P4, P41, P42, and P43 becomes, in order, b1, b03, b02, and b01; the image data of pixels P5, P51, P52, and P53 becomes b0; and the image data of pixels P6, P61, P62, and P63 becomes b0.

The stated image data b0, b01, b02, b03, and b1 indicates a gradation, where the tone changes from white to black in that order. For example, the image data b01 is light gray data, the image data b02 is gray data, and the image data b03 is dark gray data.

As opposed to this, assuming that the attribute data of the pixels P1 to P6 is, in order, a0 (a white character), a0, a1 (a black character), a1, a0, and a0, the data becomes as follows when enlarged 4× through the nearest neighbor method: the attribute data of pixels P1, P1, P12, and P13 becomes a0; the attribute data of pixels P2, P21, P22, and P23 becomes a0; the attribute data of pixels P3, P31, P32, and P33 becomes a1; the attribute data of pixels P4, P41, P42, and P43 becomes a1; the attribute data of pixels P5, P51, P52, and P53 becomes a0; and the attribute data of pixels P6, P61, P62, and P63 becomes a0.

When image data is processed using a predetermined resolution conversion method and attribute data is processed using the nearest neighbor method in this manner, the colors indicated by the image data b01 (light gray data), b02 (gray data), and b03 (dark gray data) for the pixels P21, P22, and P23 are clearly different from the colors indicated by the attribute data a0 (white characters) of the same pixels. As a result, post-processing such as edge enhancement cannot be executed properly, which in turn leads to a degradation in image quality. This degradation is particularly apparent when compressing image data into a compact PDF format.

The methods disclosed in Patent Documents 1 and 2 do not carry out resolution conversion processing on image data and attribute data without causing a degradation in image quality.

SUMMARY

Having been conceived in light of such problems, it is an object of the present invention to enable resolution conversion processing to be carried out on image data and attribute data without causing a degradation in image quality, a drop in scale ratio, and the like.

An image processing apparatus according to one aspect of the present invention is an image processing apparatus that scales image data, the image data generated by reading a document using a reading unit, by performing resolution conversion processing on the image data. The apparatus includes a detector that detects attributes of the image data generated by the reading unit, an attribute data generator that generates attribute data based on a result of detection performed by the detector, an image resolution converter that performs image resolution conversion processing on the image data of a pixel of interest, and an attribute resolution converter that performs attribute resolution conversion processing on the attribute data of the pixel of interest. The attribute resolution converter employs attribute data identical to the attribute data before being subjected to the attribute resolution conversion processing as the attribute data for the pixel of interest following the attribute resolution conversion processing, and employs the attribute data after being subjected to the attribute resolution conversion processing as the attribute data for neighboring pixels to the right and left of the pixel of interest following the attribute resolution conversion processing.

Preferably, the attributes of the image data may include halftone information indicating whether or not the image data is halftone data, edge information indicating whether or not the image data is of an edge, and character information indicating whether or not the image data is of characters and a character type. The attribute data generator may generate the attribute data based on the halftone information, the edge information, and the character information.

Further, the attribute resolution converter may employ, as the attribute data after being subjected to the attribute resolution conversion processing for the neighboring pixels, either the attribute data of the pixel of interest before being subjected to the attribute resolution conversion processing or the attribute data of adjacent pixels that are adjacent to the pixel of interest before being subjected to the attribute resolution conversion processing, or new attribute data generated based on the attribute data of the pixel of interest and the attribute data of the adjacent pixels.

DESCRIPTION OF THE PREFERRED EMBODIMENTS

An image processing apparatus 1 according to the present embodiment is used in an image forming apparatus such as an MFP (multi-function peripheral), in which a scanner unit and a printer unit are integrated into a single unit.

Figure 1:
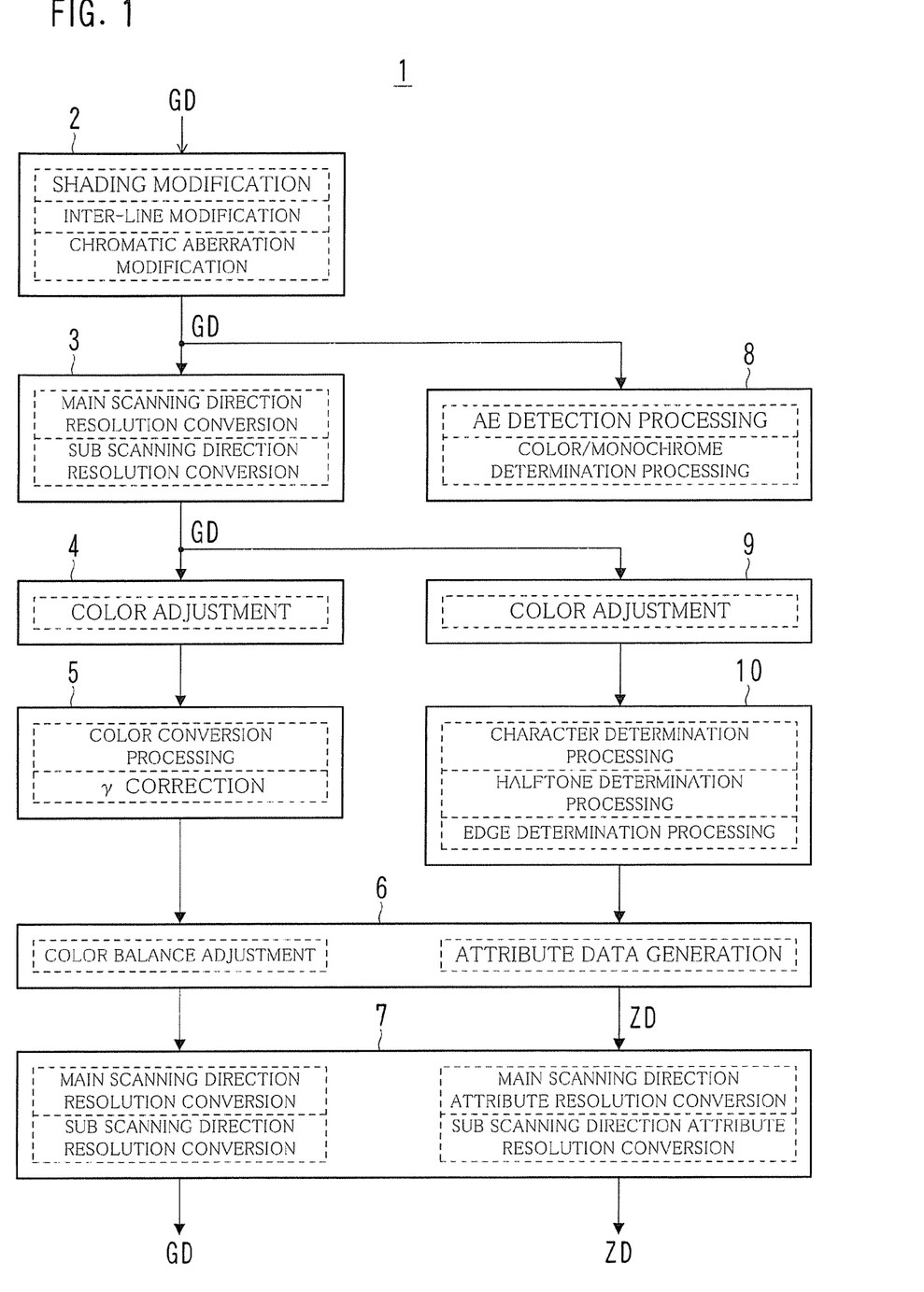
FIG. 1 is a block diagram illustrating an overall configuration of an image processing apparatus according to an embodiment of the present invention.

As illustrated in FIG. 1, the image processing apparatus 1 according to the present embodiment is configured of a scanner control unit 2, an input resolution conversion unit 3, a first image adjustment unit 4, a color conversion unit 5, an image modification unit 6, an output resolution conversion unit 7, an AE/ACS processing unit 8, a second image adjustment unit 9, and a region determination unit 10.

CPUs, memories, other types of circuit elements, and so on are used for the constituent elements of the image processing apparatus 1 described above. These may be entirely or partially integrated as ICs and used as, for example, microprocessors, ASICs (Application-Specific Integrated Circuits), or the like.

A document is read by a reading unit (not shown) configured of a CCD (charge-coupled device), a mirror, document glass, and so on, and image data GD is generated as a result.

The scanner control unit 2 performs shading modification, inter-line modification, and chromatic aberration modification on the image data GD.

"Shading modification" refers to modifying what is known as "scanner irregularities" in the image data GD (e.g. variations in the sensitivities of the pixels in the CCD, irregularities in the light distribution, and so on). "Inter-line modification" refers to modifying phase shift in R, G, and B color signals (data) arising due to positional shift between the R, G, and B lines in the CCD. This modification is performed by delaying the R and G components of the image data GD using a filed memory. Finally, "chromatic aberration modification" refers to modifying phase shift in the image data GD arising due to chromatic aberration in a lens system.

The input resolution conversion unit 3 performs conversion processing on the resolution of the image data GD in the main scanning direction and in the sub-scanning direction. The first image adjustment unit 4 adjusts the color of the image data GD. The color conversion unit 5 performs color conversion processing and γ correction on the image data GD. "Color conversion processing" refers to a process for substituting a color for another color, or a process for expressing the color data as a pure color using only one or two coloring materials. "γ correction", meanwhile, refers to correcting gradation characteristics in the image processing apparatus 1 when gradation is expressed using a dither pattern.

The image modification unit 6 adjusts the color balance of the image data GD, and generates attribute data ZD based on the image data GD that has undergone processing by the region determination unit 10, which shall be discussed later.

The attribute data ZD is data indicating attributes of the image data GD, such as: whether or not the image data GD is made up of halftone dots (whether or not the image is continuous tone); whether or not the data indicates an edge; whether or not the data indicates characters; if the data does indicate characters, whether those characters are white characters, color characters, or black characters; and so on.

The output resolution conversion unit 7 performs conversion processing on the resolution of the image data GD and the attribute data ZD generated by the image modification unit 6, in the main scanning direction and in the sub-scanning direction. Through this, the image data GD and attribute data ZD are scaled (enlarged or reduced) in the main scanning direction and the sub-scanning direction.

The AE/ACS processing unit 8 performs AE detection processing (photometric processing) and color/monochrome determination processing. The second image adjustment unit 9 adjusts the color of the image data GD.

The region determination unit 10 divides the image data GD into regions according to attributes such as characters, photographs, halftone, and so on. In other words, the region determination unit 10 performs character determination processing, halftone determination processing, and edge determination processing. In the character determination processing, it is determined whether or not the image consists of characters. In the halftone determination processing, it is determined whether or not the image is a halftone image. Finally, in the edge determination processing, it is determined whether or not the image is an edge. Note that the region determination performed by the region determination unit 10 is carried out on image data GD of, for example, 600 dpi or 400 dpi.

Figure 2:
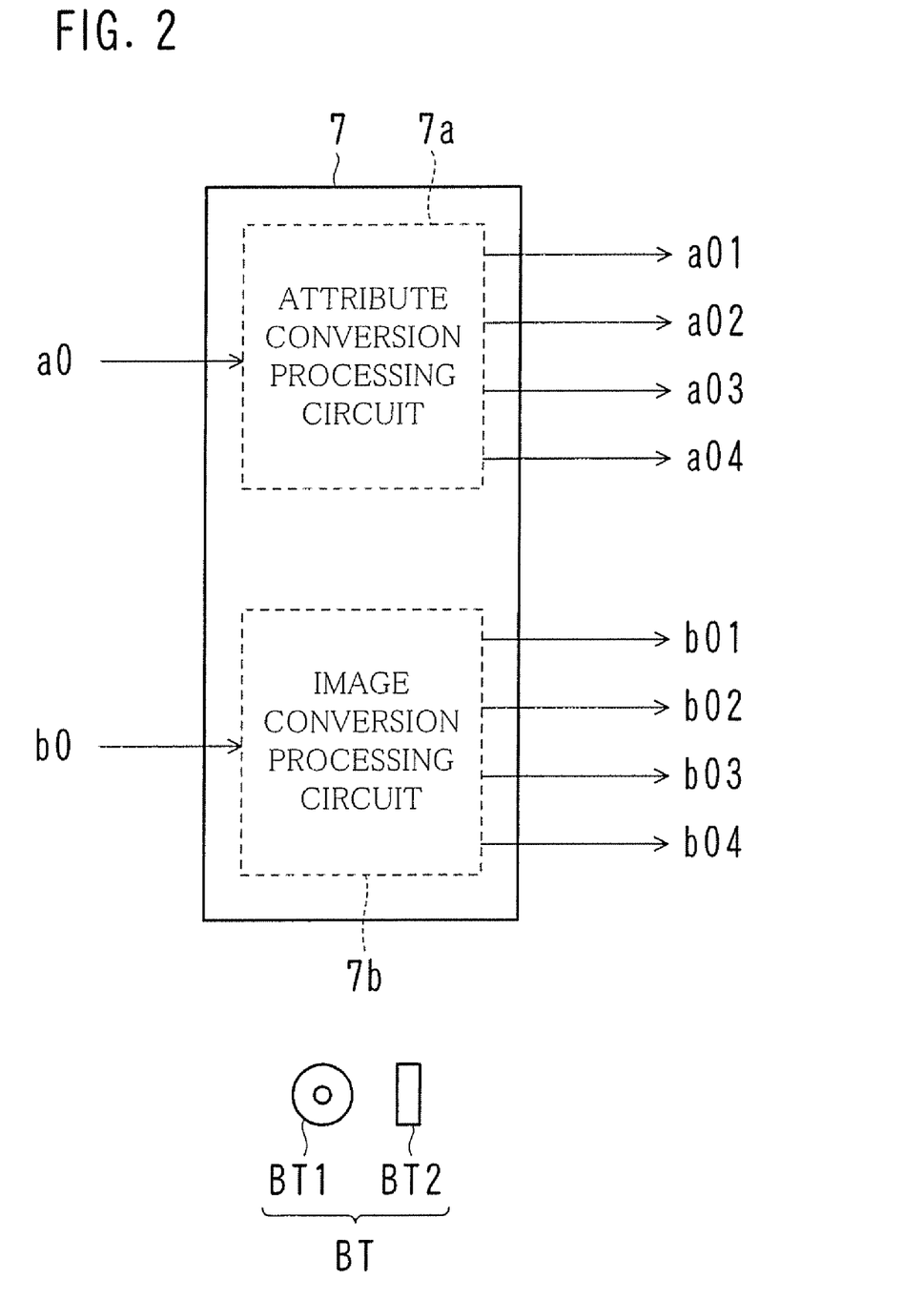
FIG. 2 is a block diagram illustrating the configuration of an output resolution conversion unit shown in FIG. 1.

As illustrated in FIG. 2, the output resolution conversion unit 7 is configured of an attribute conversion processing circuit 7a and an image conversion processing circuit 7b.

CPUs, memories, other types of circuit elements, and so on are used for the output resolution conversion unit 7. A computer program for realizing the functions of the output resolution conversion unit 7 is stored in such a memory. This type of program can be installed from a portable recording medium BT, which includes a recording medium BT1, such as a CD-ROM, DVD-ROM, or the like, or a recording medium BT2, such as a semiconductor memory or the like, the recording medium having the program recorded therein. The program may also be downloaded from a server via a network.

When the image data and attribute data are scaled 4× through resolution conversion processing, the attribute conversion processing circuit 7a converts the attribute data a0 to, for example, attribute data a01, a02, a03, and a04, whereas the image conversion processing circuit 7b converts the image data b0 to, for example, image data b01, b02, b03, and b04. In such a manner, rather than simply being duplicated, resolution conversion is also carried out on the attribute data, as well as the image data, in the present embodiment.

Descriptions shall now be provided regarding the resolution conversion carried out on the attribute data by the image processing apparatus 1 according to the present embodiment.

Figure 3:
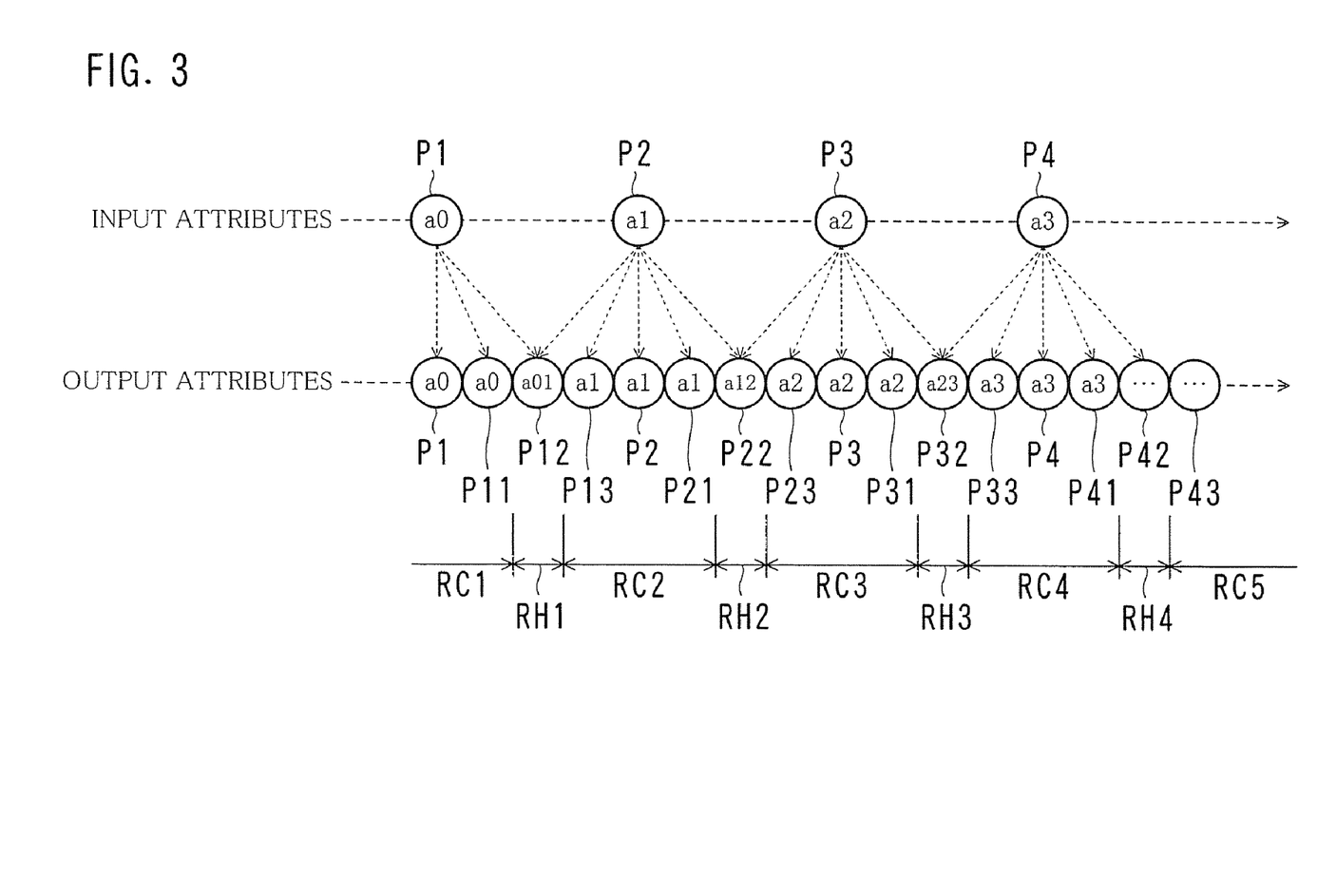
FIG. 3 is a diagram illustrating resolution conversion processing performed on attribute data.

In FIG. 3, the attribute data of an inputted pixel P1 is a0, the attribute data of an inputted pixel P2 is a1, the attribute data of an inputted pixel P3 is a2, and the attribute data of an inputted pixel P4 is a3; resolution conversion processing is executed thereon so as to enlarge this data 4×.

In the present embodiment, a region RC (called an "input data replacement region" hereinafter), where the inputted attribute data is used as-is, and a region RH (called an "interpolated pixel generation region" hereinafter), where new attribute data is generated from the attribute data of two adjacent inputted pixels, are set as regions of the pixels P on the output side. The output resolution conversion unit 7 switches between allocating attribute data to the pixels P belonging to the input data replacement region RC and allocating attribute data to the pixels P belonging to the interpolated pixel generation region RH.

In the example shown in FIG. 3, pixels P1, P11, and so on belong to an input data replacement region RC1; a pixel P12 belongs to an interpolated pixel generation region RH1; pixels P13, P2, and P21 belong to an input data replacement region RC2; and a pixel P22 belongs to an interpolated pixel generation region RH2.

Furthermore, pixels P23, P3, and P31 belong to an input data replacement region RC3; a pixel P32 belongs to an interpolated pixel generation region RH3; pixels P33, P4, and P41 belong to an input data replacement region RC4; a pixel P42 belongs to an interpolated pixel generation region RH4; and a pixel P43 belongs to an input data replacement region RC5.

As described above, in the present embodiment, the inputted attribute data is employed as-is for the attribute data of pixels present in the input data replacement region RC. Therefore, a0 is employed for the attribute data of pixels P1 and P11, a1 is employed for the attribute data of pixels P13, P2, and P21, a2 is employed for the attribute data of pixels P23, P3, and P31, and a3 is employed for the attribute data of pixels P33, P4, and P41.

However, new attribute data generated from the attribute data of two adjacent inputted pixels is employed for the attribute data of pixels present in the interpolated pixel generation region RH. Therefore, a01 is employed for the attribute data of pixel P12, a12 is employed for the attribute data of pixel P22, and a23 is employed for the attribute data of pixel P32.

The attribute data a01 is new attribute data generated from the attribute data a0 and a1 of two adjacent inputted pixels P1 and P2; the attribute data a12 is new attribute data generated from the attribute data a1 and a2 of pixels P2 and P3; and attribute data a23 is new attribute data generated from the attribute data a2 and a3 of pixels P3 and P4.

Figure 4A:
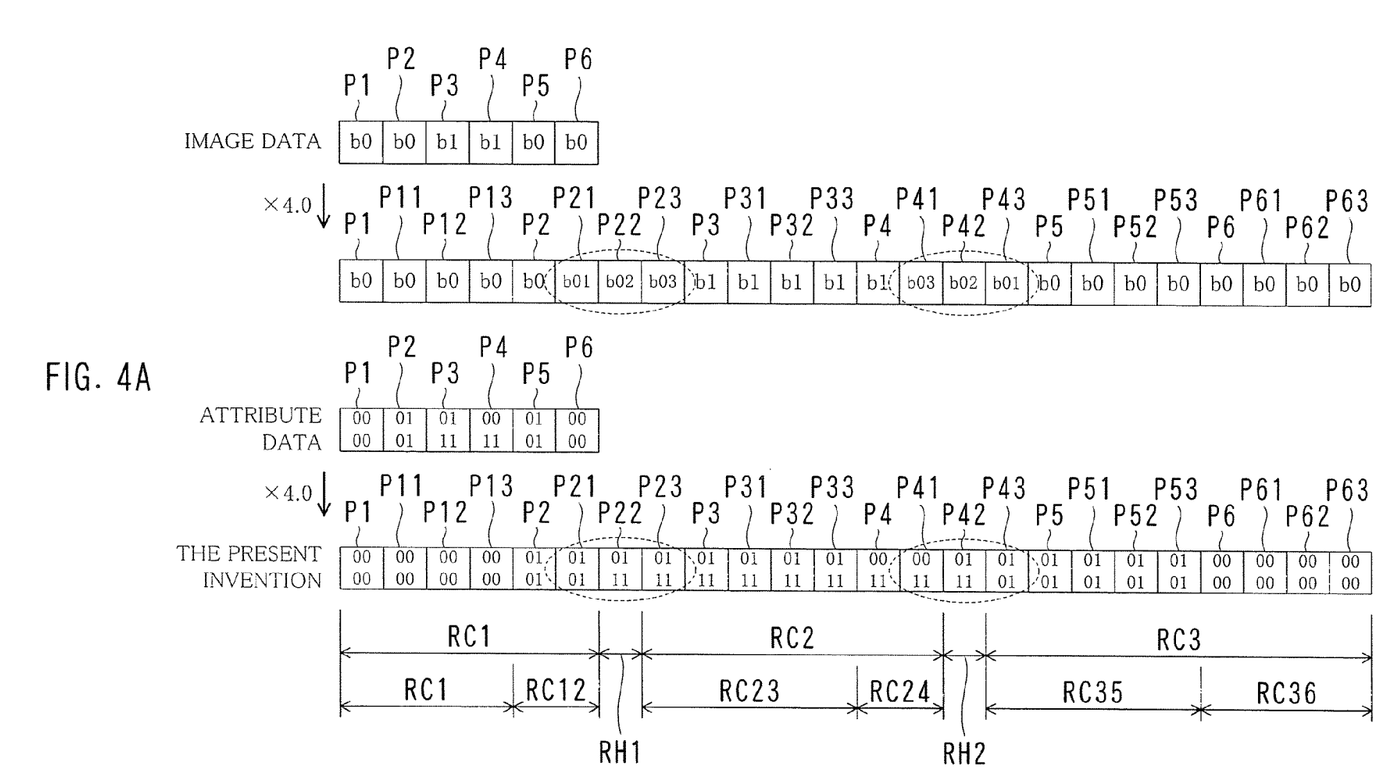
FIGS. 4A and 4B are diagrams illustrating image data and attribute data on which resolution conversion has been executed.
Figure 4B:
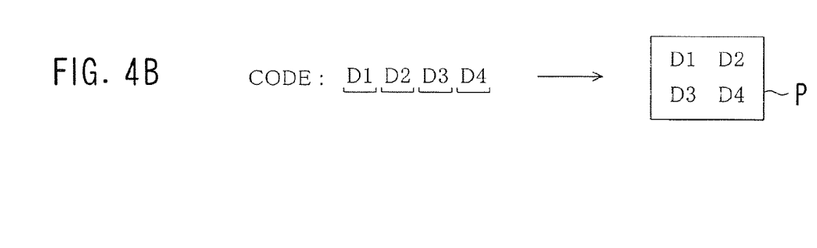

FIGS. 4A and 4B are diagrams illustrating image data and attribute data on which resolution conversion has been executed, and FIGS. 5A through 5C are diagrams illustrating a method for generating attribute data for pixels in the interpolated pixel generation region RH.

Assuming that, as illustrated in FIG. 4A, the image data of pixels P1 to P6, which are pixels of interest, is, in order, b0 (white data), b0, b1 (black data), b1, b0, and b0, the data becomes as follows when enlarged 4× through a resolution conversion processing using the bicubic method: the image data of pixels P1, P11, P12, and P13 becomes b0; the image data of pixels P2, P21, P22, and P23 becomes, in order, b0, b01, b02, and b03; the image data of pixels P3, P31, P32, and P33 becomes b1; the image data of pixels P4, P41, P42, and P43 becomes, in order, b1, b03, b02, and b01; the image data of pixels P5, P51, P52, and P53 becomes b0; and the image data of pixels P6, P61, P62, and P63 becomes b0. Note that the bicubic method is an interpolation method that uses cubic polynomials, and is a method that obtains the image data of a pixel of interest from cubic polynomials based on the values of 16 pixels (4 vertical and 4 horizontal) in the vicinity of the pixel of interest for which the image data is to be found.

The aforementioned image data b0, b01, b02, b03, and b1 indicate a gradation, where the tone changes from white to black in that order. For example, the image data b01 is light gray data, the image data b02 is gray data, and the image data b03 is dark gray data.

However, in the present embodiment, the details of the attribute data is expressed using code realized by bits, and the details of the attribute data of pixels in the interpolated pixel generation region RH is also expressed by code. In FIG. 4A, the code that expresses the attribute data of the pixels P1 through P6 is, in order, 0000, 0100, 0111, 0011, 0100, and 0000. The details of the attribute data expressed by the code shall be mentioned later.

When illustrating such 4-digit code within the pixels P shown in FIG. 4A, and assuming that the four digits in the code are represented by D1, D2, D3, and D4 in order from the most significant digit, D1 is located at the upper left, D2 at the upper right, D3 at the lower left, and D4 at the lower right of each pixel P, as indicated in FIG. 4B.

The following are provided as regions for the post-resolution conversion pixels P: an input data replacement region RC1, including an input data replacement region RC11 to which pixels P employing the attribute data of the pixel P1 as-is belong, and an input data replacement region RC12 to which pixels P employing the attribute data of the pixel P2 as-is belong; an interpolated pixel generation region RH1 in which attribute data is generated from the pixels P2 and P3 and employed; an input data replacement region RC2, including an input data replacement region RC23 to which pixels P employing the attribute data of the pixel P3 as-is belong, and an input data replacement region RC24 to which pixels P employing the attribute data of the pixel P4 as-is belong; an interpolated pixel generation region RH2 in which attribute data is generated from the pixels P4 and P5 and employed; and an input data replacement region RC3, including an input data replacement region RC35 to which pixels P employing the attribute data of the pixel P5 as-is belong, and an input data replacement region RC36 to which pixels P employing the attribute data of the pixel P6 as-is belong.

Next, the details of the attribute data, as well as a method for generating the attribute data of the pixels P within the interpolated pixel generation regions RH, shall be described with reference to FIGS. 5A through 5C.

As shown in FIG. 5A, the attribute data code used in the present embodiment indicates whether or not the pixel P is in a halftone dot; whether or not the pixel P is on an edge; whether or not the pixel P is in a character; and if the pixel P is in a character, whether the character is a white character, a color character, or a black character.

In the present embodiment, the attribute data is 4-digit attribute information expressed in 4 bits. If the most significant digit is 0, the pixel P is not in a halftone dot, whereas if the most significant digit is 1, the pixel P is in a halftone dot. Meanwhile, if the next digit down from the most significant digit is 0, the pixel P is not on an edge, whereas if that digit is 1, the pixel P is on an edge.

Furthermore, if the next digit up from the least significant digit and the least significant digit together are 00, there is no character, whereas the pixel P is in a white character if these digits are 01, the pixel P is in a color character if these digits are 10, and the pixel P is in a black character if these digits are 11.

Such 4-bit attribute data is decoded into 6-digit attribute data expressed by 6 bits in order to obtain a logical sum during the process of generating the attribute data (interpolation processing), described later. In other words, up to the fourth digit from the least significant digit is used, and thus 0001 indicates that no characters are present, 0010 indicates that the pixel P is in a white character, 0100 indicates that the pixel P is in a color character, and 1000 indicates that the pixel P is in a black character. Note, however, that the details indicated by the most significant digit and the next digit up from the most significant digit are the same as described above in this case as well.

Next, the attribute data of the pixels P in the interpolated pixel generation region RH is generated using the attribute data made up of the 6 digits of two adjacent pixels.

In the present embodiment, a logical sum of the attribute data made up of the 6 digits of two pixels is obtained. To describe in more detail, the logical sum of the attribute data 011000 and 000001 of two adjacent pixels, or 011001, is obtained, and that logical sum is taken as the attribute data of the pixels P in the interpolated pixel generation region RH.

Next, the 6-bit attribute data obtained from the logical sum is re-encoded into 4-bit attribute data. In this case, the lowest 4 digits of the attribute data obtained through the logical sum are re-encoded into 2 digits.

To be more specific, if the lowest 4 digits of the attribute data are 0001, it is assumed that there is no character, and thus the digits are re-encoded into 00; if the lowest 4 digits of the attribute data are 001x (where x is arbitrary), it is assumed that the pixel P is in a white character, and thus the digits are re-encoded into 01; if the lowest 4 digits of the attribute data are 01xx, it is assumed that the pixel P is in a color character, and thus the digits are re-encoded into 10; and if the lowest 4 digits of the attribute data are 1xxx, it is assumed that the pixel P is in a black character, and thus the digits are re-encoded into 11.

Accordingly, by setting 1xxx as a standard for determination of the lowest 4 digits of the attribute data, a higher level of priority can be set for when the pixel P is in a black character than as for when the pixel P is in a white character, and so on. This in turn makes it possible to sufficiently enhance black characters during the edge enhancement process, which is an example of post-processing.

As described above, if the attribute data obtained through the logical sum is 011001, the lowest 4 digits thereof are equivalent to 1xxx, and thus the re-encoded attribute data is 0111. In this case, the re-encoded attribute data 0111 indicates a pixel P in an interpolated pixel generation region RH that is part of a continuous tone, is on an edge, and is in a black character.

A case where such a method for generating the attribute data of pixels P in an interpolated pixel generation region RH is applied to the example shown in FIG. 4A shall be described next.

The attribute data of the pixel P22 in the interpolated pixel generation region RH1 is obtained from the attribute data 0101 of the pixel P2 and the attribute data 0111 of the pixel P3.

First, the attribute data 0101 of the pixel P2 and the attribute data 0111 of the pixel P3 are decoded into 6-digit attribute data, resulting in 010010 and 011000, respectively. Obtaining the logical sum of these results in 011010.

Next, re-encoding 011010, obtained through the logical sum, makes it possible to obtain 0111 for the attribute data of the pixel P22 in the interpolated pixel generation region RH1. The attribute data of the pixel P42 in the interpolated pixel generation region RH2 can be obtained in the same manner.

As described thus far, in the present embodiment, an interpolated pixel generation region RH is provided in the region of outputted pixels P; employing attribute data obtained through a logical sum of the attribute data of a pixel of interest and the attribute data of pixels adjacent to the pixel of interest (adjacent pixels) and expressed in bits as the attribute data of pixels P belonging to the interpolated pixel generation region RH makes it possible to reduce the difference between the details of the image data and the attribute data of the pixels P.

According to the conventional nearest neighbor method, the attribute data of the pixel P22 in the interpolated pixel generation region RH1 is a0 (a white character), which is, as shown in FIG. 9, clearly different from the details (i.e., a gray color) indicated by the image data b02 of the pixel P22.

However, according to the image processing apparatus 1 of the present embodiment, the details of the attribute data of the pixel P22 indicate a black character on an edge, as shown in FIG. 4A, and thus the difference between the details indicated by the image data b02 of the pixel 22 and the details indicated by the attribute data is reduced.

This makes it possible to suppress a degradation in image quality caused by problems with post-processing such as edge enhancement, where, for example, the processing for enhancing black characters cannot be carried out because the attribute data indicates white characters.

(Other Embodiments)

Generation of the attribute data by the image processing apparatus 1 according to the present embodiment may alternatively be executed in the following manner.

Figure 6:
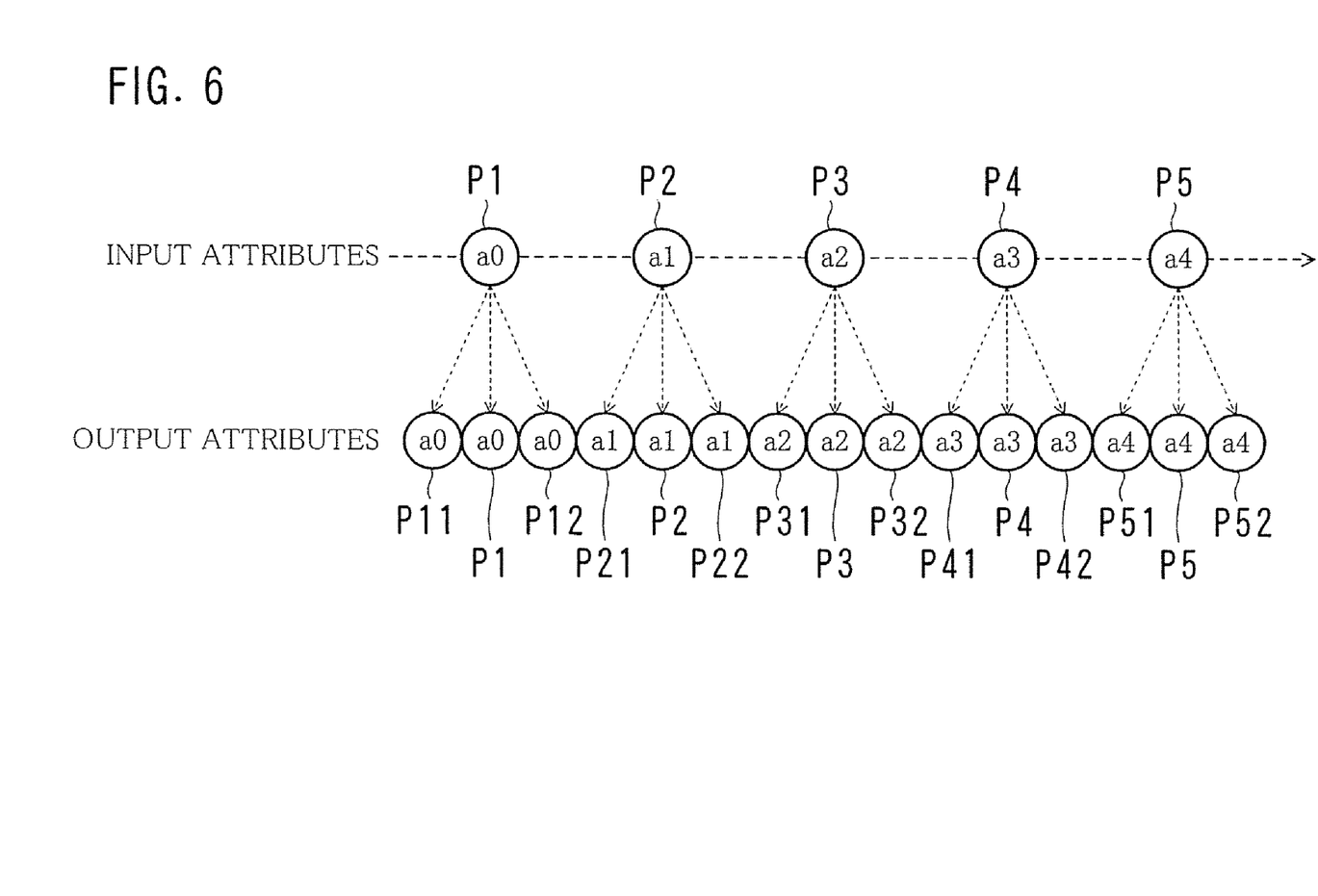
FIG. 6 is a diagram illustrating another example of a method for generating attribute data using the image processing apparatus.

FIG. 6 is a diagram illustrating another example of a method for generating attribute data using the image processing apparatus 1. As illustrated in FIG. 6, if the attribute data of pixels P1 to P5, which are pixels of interest, is, for example, a0, a1, a2, a3, and a4, respectively, the attribute data of the pixels of interest is employed as the attribute data of the adjacent pixels on both sides of each of the pixels of interest when viewed in the main scanning direction.

In FIG. 6, for example, the attribute data a0 of the inputted pixel P1 is employed as-is as the attribute data of the outputted pixel P1, and a0 is also employed as the attribute data of the pixels P11 and P12, which are adjacent to and on either side of the pixel P1.

Generating the attribute data using such a method makes it possible to reduce the amount of attribute data stored in a memory (not shown) provided in the image processing apparatus 1.

Furthermore, the span of the interpolated pixel generation region RH, or in other words, the number of pixels in the interpolated pixel generation region RH, can be set as desired. For example, although the number of pixels in the interpolated pixel generation regions RH1 and RH2 is 1 in FIG. 4A, this number may be set to 2 or more.

Finally, the configuration, processing content, processing order, and so on of the image processing apparatus 1 in its entirety or the various constituent elements included therein may be altered as appropriate within the spirit of the present invention. The abovementioned unique and distinguished effects can be attained in such a case as well.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus that scales image data, the image data generated by reading a document using a reading unit, by performing resolution conversion processing on the image data, the apparatus comprising:
    a detector that detects attributes of the image data generated by the reading unit;
    an attribute data generator that generates attribute data based on a result of detection performed by the detector;
    an image resolution converter that performs image resolution conversion processing on the image data of a pixel of interest; and
    an attribute resolution converter that performs attribute resolution conversion processing on the attribute data of the pixel of interest,
    the attribute resolution converter assigning attribute data identical to the attribute data before being subjected to the attribute resolution conversion processing as the attribute data for the pixel of interest following the attribute resolution conversion processing, and assigning the attribute data after being subjected to the attribute resolution conversion processing as the attribute data for neighboring pixels to the right and left of the pixel of interest following the attribute resolution conversion processing.

2. The image processing apparatus according to claim 1, wherein the attributes of the image data include halftone information indicating whether or not the image data is halftone data, edge information indicating whether or not the image data is of an edge, and character information indicating whether or not the image data is of characters and a character type; and
    the attribute data generator generates the attribute data based on the halftone information, the edge information, and the character information.

3. The image processing apparatus according to claim 1, wherein the attribute resolution converter assigns, as the attribute data after being subjected to the attribute resolution conversion processing for the neighboring pixels, either the attribute data of the pixel of interest before being subjected to the attribute resolution conversion processing or the attribute data of adjacent pixels that are adjacent to the pixel of interest before being subjected to the attribute resolution conversion processing, or new attribute data generated based on the attribute data of the pixel of interest and the attribute data of the adjacent pixels.

4. The image processing apparatus according to claim 3, wherein the attribute resolution converter includes a switcher that switches which attribute data is to be assigned for the neighboring pixels.

5. The image processing apparatus according to claim 3, wherein the attribute data is configured of code information expressed in bits; and
    the attribute resolution converter assigns, as the new attribute data, attribute data based on code information obtained through a logical sum of the code information of the attribute data of the pixel of interest and the code information of the attribute data of the adjacent pixels.

6. The image processing apparatus according to claim 1, wherein the attribute resolution converter assigns attribute data identical to the attribute data of the pixel of interest before being subjected to the attribute resolution conversion processing for the same number of neighboring pixels on the right and left of the pixel of interest.

7. The image processing apparatus according to claim 1, wherein the attribute data before being subjected to the attribute resolution conversion processing is binary data, and the attribute data following the attribute resolution conversion processing is binary data.

8. The image processing apparatus according to claim 1, wherein the attribute resolution converter determines an interpolated pixel generation region between adjacent pixels of interest having different image data, and assigns new attribute data, which is generated based on the attribute data of the adjacent pixels of interest having different image data, to pixels in the interpolated pixel generation region.

9. An image processing method that scales image data, the image data generated by reading a document, by performing resolution conversion processing on the image data, the method comprising the steps of:
    detecting attributes of the generated image data;
    generating attribute data based on a result of the detecting;
    performing image resolution conversion processing on the image data of a pixel of interest; and
    performing attribute resolution conversion processing that assigns attribute data identical to the attribute data before being subjected to the attribute resolution conversion processing as the attribute data for the pixel of interest following the attribute resolution conversion processing, and assigns the attribute data after being subjected to the attribute resolution conversion processing as the attribute data for neighboring pixels to the right and left of the pixel of interest following the attribute resolution conversion processing.

10. The image processing method according to claim 9, wherein the attributes of the image data include halftone information indicating whether or not the image data is halftone data, edge information indicating whether or not the image data is of an edge, and character information indicating whether or not the image data is of characters and a character type; and the attribute data is generated based on the halftone information, the edge information, and the character information.

11. The image processing method according to claim 9, wherein the performing attribute resolution conversion processing assigns, as the attribute data after being subjected to the attribute resolution conversion processing for the neighboring pixels, either the attribute data of the pixel of interest before being subjected to the attribute resolution conversion processing or the attribute data of adjacent pixels that are adjacent to the pixel of interest before being subjected to the attribute resolution conversion processing, or new attribute data generated based on the attribute data of the pixel of interest and the attribute data of the adjacent pixels.

12. The image processing method according to claim 11, wherein the performing attribute resolution conversion processing includes switching which attribute data is to be assigned for the neighboring pixels.

13. The image processing method according to claim 11, wherein the attribute data is configured of code information expressed in bits; and the performing attribute resolution conversion processing assigns, as the new attribute data, attribute data based on code information obtained through a logical sum of the code information of the attribute data of the pixel of interest and the code information of the attribute data of the adjacent pixels.

14. The image processing method according to claim 9, wherein the performing attribute resolution conversion processing assigns attribute data identical to the attribute data of the pixel of interest before being subjected to the attribute resolution conversion processing for the same number of neighboring pixels on the right and left of the pixel of interest.

15. The image processing method according to claim 9, wherein the attribute data before being subjected to the attribute resolution conversion processing is binary data, and the attribute data following the attribute resolution conversion processing is binary data.

16. The image processing method according to claim 9, further comprising the steps of:

determining an interpolated pixel generation region between adjacent pixels of interest having different image data; and assigning new attribute data, which is generated based on the attribute data of the adjacent pixels of interest having different image data, to pixels in the interpolated pixel generation region.

17. A non-transitory computer-readable medium having stored thereon a program for causing a computer to execute the steps of:

reading a document and generating image data;
detecting attributes of the generated image data;
generating attribute data based on a result of the detecting;
performing image resolution conversion processing on the image data of a pixel of interest; and performing attribute resolution conversion processing that assigns attribute data identical to the attribute data before being subjected to the attribute resolution conversion processing as the attribute data for the pixel of interest following the attribute resolution conversion processing, and assigns the attribute data after being subjected to the attribute resolution conversion processing as the attribute data for neighboring pixels to the right and left of the pixel of interest following the attribute resolution conversion processing.

18. The non-transitory computer-readable medium according to claim 17, wherein the attributes of the image data include halftone information indicating whether or not the image data is halftone data, edge information indicating whether or not the image data is of an edge, and character information indicating whether or not the image data is of characters and a character type; and the attribute data is generated based on the halftone information, the edge information, and the character information.

19. The non-transitory computer-readable medium according to claim 17, wherein the performing attribute resolution conversion processing assigns, as the attribute data after being subjected to the attribute resolution conversion processing for the neighboring pixels, either the attribute data of the pixel of interest before being subjected to the attribute resolution conversion processing or the attribute data of adjacent pixels that are adjacent to the pixel of interest before being subjected to the attribute resolution conversion processing, or new attribute data generated based on the attribute data of the pixel of interest and the attribute data of the adjacent pixels.

20. The non-transitory computer-readable medium according to claim 19, wherein the performing attribute resolution conversion processing includes switching which attribute data is to be assigned for the neighboring pixels.

21. The non-transitory computer-readable medium according to claim 19, wherein the attribute data is configured of code information expressed in bits; and the performing attribute resolution conversion processing assigns, as the new attribute data, attribute data based on code information obtained through a logical sum of the code information of the attribute data of the pixel of interest and the code information of the attribute data of the adjacent pixels.

22. The non-transitory computer-readable medium according to claim 17, wherein the performing attribute resolution conversion processing assigns attribute data identical to the attribute data of the pixel of interest before being subjected to the attribute resolution conversion processing for the same number of neighboring pixels on the right and left of the pixel of interest.

23. The non-transitory computer-readable medium according to claim 17, wherein the attribute data before being subjected to the attribute resolution conversion processing is binary data, and the attribute data following the attribute resolution conversion processing is binary data.

24. The non-transitory computer-readable medium according to claim 17, wherein the program is for further causing the computer to execute the steps of:
  determining an interpolated pixel generation region between adjacent pixels of interest having different image data; and
  assigning new attribute data, which is generated based on the attribute data of the adjacent pixels of interest having different image data, to pixels in the interpolated pixel generation region.

* * * * *